A. D. JUDD.
Shutter-Fastener.
No. 162,563.
Patented April 27, 1875.
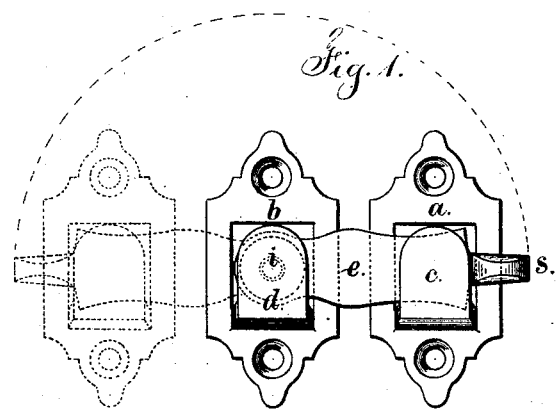
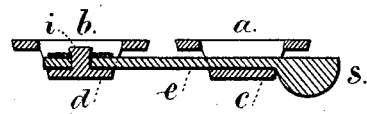
Witnesses,
Chas. H. Smith
Geo. D. Walker.
Inventor
Albert D. Judd
per L. W. Serrell
atty

UNITED STATES PATENT OFFICE.

ALBERT D. JUDD, OF NEW HAVEN, CONNECTICUT.

IMPROVEMENT IN SHUTTER-FASTENERS.

Specification forming part of Letters Patent No. 162,563, dated April 27, 1875; application filed November 25, 1874.

CASE F.

*To all whom it may concern:*

Be it known that I, ALBERT D. JUDD, of New Haven, in the State of Connecticut, have invented an Improvement in Shutter-Fastening-Bars, of which the following is a specification:

Shutter-fastenings have been made with bars that could be turned upon either side, so as to place the fulcrum at either the right or left side, and these shutter-bars have been similar in appearance at both ends.

My invention is made for simplifying the construction, dispensing with sockets and buttons upon such fastenings, and for indicating which end of the lever-bar is to be moved.

I employ two plates with similar projecting central hooks, and to the back of one of these the lever-bar is attached and swings upon its rivet or screw, and the bar can be turned entirely over, so as to extend to the right or left and be supported nearly horizontally by the bottom part of the hook, and the moving end of the lever-bar has a thumb-piece, and the lever swings into the hook of the plate upon the other shutter, so that the shutters are held in position, and the bar cannot draw out of the hook in consequence of the projecting thumb-piece.

In the drawing, Figure 1 is an elevation, and Fig. 2 is a horizontal section of said fastening.

The plates $a\, b$ are of any desired ornamental character. They are open in the center, and the hooks $c$ and $d$ project in front of the respective openings, and these plates and their hooks can be of cast metal, or the hook can be pressed out of the plate if the parts are of wrought metal. The lever-bar $e$ passes behind both hooks when in use. At one end the bar $e$ is attached to the hook $d$ by the screw or rivet $i$, and said bar can be swung over to either side, as illustrated in Fig. 1 by dotted lines, and said bar will be kept nearly horizontal by resting upon the bottom of the hook $c$. The thumb-piece $s$, at the swinging end of the bar $e$ serves for moving said bar, and when the bar is turned down behind said hook $c$, the thumb-piece, acting against the inclined edges of the hook $c$, serves to draw the plate $a$ toward the plate $b$, thereby holding the blinds properly together.

I claim as my invention—

The shutter-fastening made of the bar $e$, attached at one end behind the hook $d$ of the plate $b$, and swinging into the hook $c$ of the plate $a$, and having the thumb-piece $s$, projecting at the outer end of the said bar $e$, substantially as and for the purposes set forth.

Signed by me this 21st day of November, A. D. 1874.

A. D. JUDD.

Witnesses:
JULIUS TWISS,
J. W. BISHOP.